US008337026B2

United States Patent
Chen et al.

(10) Patent No.: US 8,337,026 B2
(45) Date of Patent: Dec. 25, 2012

(54) ADJUSTING MECHANISM, PROJECTOR, ELECTRONIC WHITEBOARD, AND ADJUSTING METHODS OF PROJECTOR AND ELECTRONIC WHITEBOARD

(75) Inventors: Shou-Chih Chen, Hsin-Chu (TW); Sea-Huang Lee, Hsin-Chu (TW)

(73) Assignee: Coretronic Corporation, Hsin-chu (TW)

( * ) Notice: Subject to any disclaimer, the term of this patent is extended or adjusted under 35 U.S.C. 154(b) by 300 days.

(21) Appl. No.: 12/693,454

(22) Filed: Jan. 26, 2010

(65) Prior Publication Data
US 2011/0051099 A1    Mar. 3, 2011

(30) Foreign Application Priority Data

Aug. 28, 2009  (CN) .......................... 2009 1 0171018

(51) Int. Cl.
G03B 21/14 (2006.01)
A47H 1/10 (2006.01)
(52) U.S. Cl. ......................................... 353/79; 248/324
(58) Field of Classification Search .................... 353/70, 353/79, 119, 122; 312/10.1; 348/798–800, 348/825, 836, 839, 843; 352/34, 242, 243; 248/324, 917, 923
See application file for complete search history.

(56) References Cited

U.S. PATENT DOCUMENTS

| 6,059,413 | A * | 5/2000 | Okubo ............................. 353/77 |
| 6,179,426 | B1 * | 1/2001 | Rodriguez et al. ............... 353/69 |
| 6,323,903 | B1 * | 11/2001 | Poulsen et al. ................. 348/373 |
| 6,485,146 | B2 | 11/2002 | Rodriguez, Jr. |

FOREIGN PATENT DOCUMENTS

| TW | 509441 | 11/2002 |
| TW | 516990 | 1/2003 |

* cited by examiner

Primary Examiner — Thanh Luu
Assistant Examiner — Renee Naphas
(74) Attorney, Agent, or Firm — Jianq Chyun IP Office

(57) ABSTRACT

An electronic whiteboard includes a projection unit, an adjusting mechanism, and a projection screen. The adjusting mechanism includes a fixing base, a rotary plate, and a first screw. The fixing base is adapted to be fixed to a fixing object. The rotary plate is pivotally connected to the fixing base, and is ball jointed to the projection unit. The first screw is locked on the rotary plate, and is ball jointed to the projection unit. The first screw drives the projection unit to rotate relatively to the rotary plate along a first axis when the first screw is rotated. The projection screen is adapted to be fixed to the fixing object. The projection unit is capable of projecting an image beam onto the projection screen.

14 Claims, 5 Drawing Sheets

ADJUSTING MECHANISM, PROJECTOR, ELECTRONIC WHITEBOARD, AND ADJUSTING METHODS OF PROJECTOR AND ELECTRONIC WHITEBOARD

CROSS-REFERENCE TO RELATED APPLICATION

This application claims the priority benefit of Chinese application serial no. 200910171018.7, filed Aug. 28, 2009. The entirety of the above-mentioned patent application is hereby incorporated by reference herein and made a part of specification.

BACKGROUND OF THE INVENTION

1. Field of the Invention

The invention relates to an electronic device and an adjusting method of the electronic device. More particularly, the invention relates to an adjusting mechanism, a projector, an electronic whiteboard, and adjusting methods of the projector and the electronic whiteboard.

2. Description of Related Art

A projector is a display device capable of generating large-size images. An imaging principle of the projector is as follows. First, a light valve converts a light beam generated by a light source module into an image beam. Then, the image beam is projected to a screen or a wall through a lens.

To ensure the projector to accurately project the image beam to the screen or the wall to form an image, mounting members used for mounting the projector to a ceiling or the wall generally have an angle-adjusting function.

Taiwan Patent Nos. 516990 and 509441 and U.S. Pat. Nos. 6,179,426 and 6,485,146 disclose the related techniques.

SUMMARY OF THE INVENTION

The invention is directed to an adjusting mechanism, capable of independently adjusting angles of a projection unit in all directions.

The invention is directed to a projector, and an adjusting mechanism of the projector capable of independently adjusting angles of a projection unit in all directions.

The invention is directed to an electronic whiteboard, and an adjusting mechanism of the electronic whiteboard capable of independently adjusting angles of a projection unit in all directions.

The invention is directed to a method for adjusting a projector, capable of independently adjusting angles of a projection unit in all directions.

The invention is directed to a method for adjusting an electronic whiteboard, capable of independently adjusting angles of a projection unit in all directions.

Additional aspects and advantages of the invention may be set forth in the description of the techniques disclosed in the invention.

To achieve at least one of aforementioned or other advantages, one embodiment of the invention provides an adjusting mechanism, and the adjusting mechanism is capable of adjusting an angle of a projection unit relative to a fixing object. The adjusting mechanism includes a fixing base, a rotary plate, and a first screw. The fixing base is adapted to be fixed to the fixing object. The rotary plate is pivotally connected to the fixing base, and is adapted to be ball-jointed to the projection unit. The first screw is locked on the rotary plate, and is adapted to be ball-jointed to the projection unit. The first screw drives the projection unit to rotate relatively to the rotary plate along a first axis when the first screw is rotated.

To achieve at least one of aforementioned or other advantages, one embodiment of the invention provides a projector including a projection unit and an adjusting mechanism. The adjusting mechanism includes a fixing base, a rotary plate, and a first screw. The fixing base is adapted to be fixed to a fixing object. The rotary plate is pivotally connected to the fixing base, and is ball-jointed to the projection unit. The first screw is locked on the rotary plate, and is ball-jointed to the projection unit. The first screw drives the projection unit to rotate relatively to the rotary plate along a first axis when the first screw is rotated.

To achieve at least one of aforementioned or other advantages, one embodiment of the invention provides a method for adjusting the aforementioned projector. By the method, the first screw is rotated to drive the projection unit to rotate relatively to the rotary plate along the first axis.

To achieve at least one of aforementioned or other advantages, one embodiment of the invention provides an electronic whiteboard including a projection unit, an adjusting mechanism, and a projection screen. The adjusting mechanism includes a fixing base, a rotary plate, and a first screw. The fixing base is adapted to be fixed to a fixing object. The rotary plate is pivotally connected to the fixing base, and is ball-jointed to the projection unit. The first screw is locked on the rotary plate, and is ball-jointed to the projection unit. The first screw drives the projection unit to rotate relatively to the rotary plate along a first axis when the first screw is rotated. The projection screen is adapted to be fixed to the fixing object. The projection unit is capable of projecting an image beam onto the projection screen.

To achieve at least one of aforementioned or other advantages, one embodiment of the invention provides a method for adjusting the aforementioned electronic whiteboard. By the method, the first screw is rotated to drive the projection unit to rotate relatively to the rotary plate along the first axis.

According to the above descriptions, the above embodiments or the above embodiments of the invention may have at least one of the following advantages, the first screw may be rotated to drive the projection unit to rotate relatively to the rotary plate along the first axis, so as to independently adjust an angle of the projection unit in a single direction without causing an angle deviation of the projection unit in other directions, so that an adjustment difficulty of the projection unit is decreased, and adjusting time is saved.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
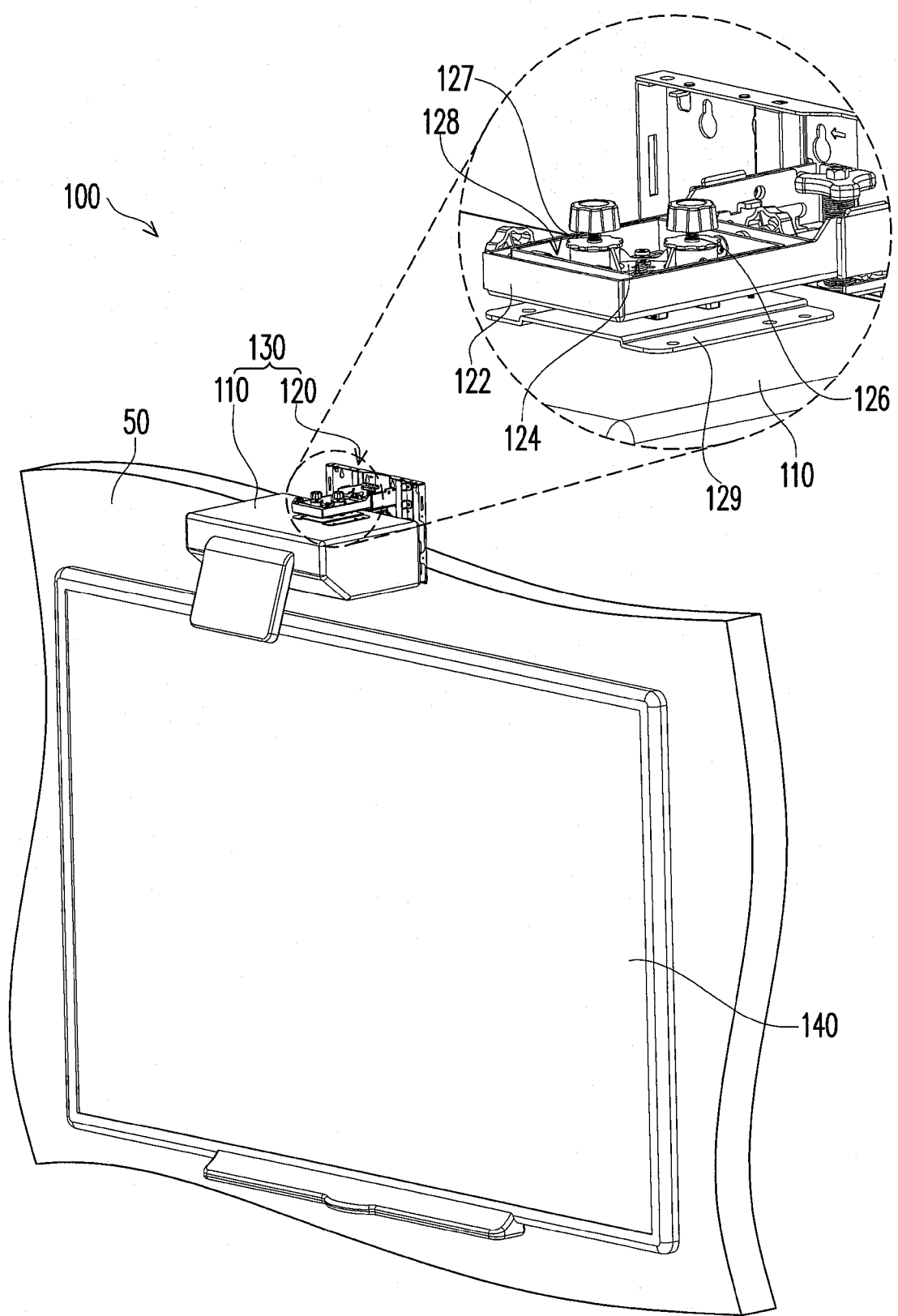
FIG. 1 is a three-dimensional view of an electronic whiteboard according to an embodiment of the invention.
Figure 2:
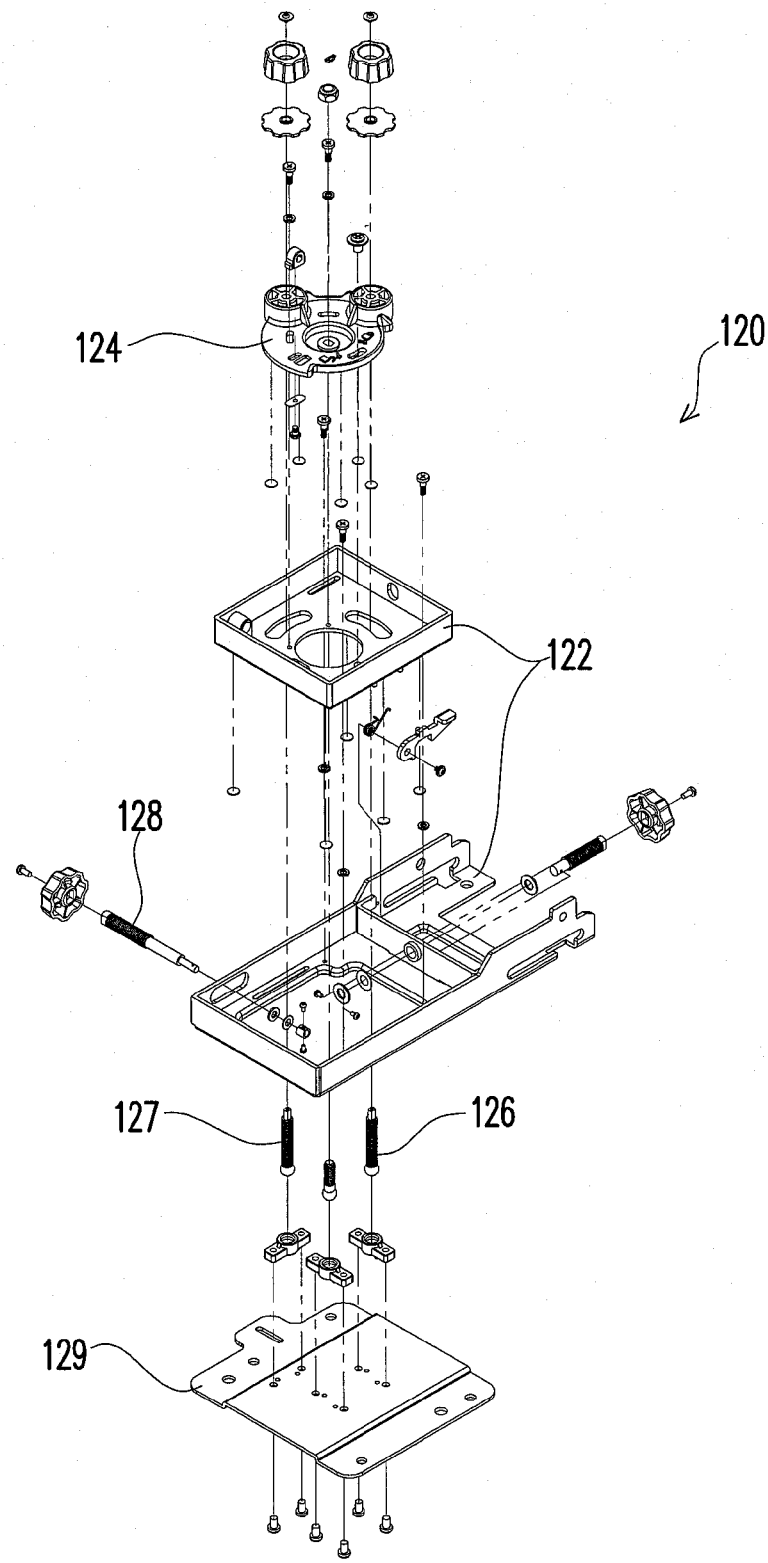
FIG. 2 is an exploded view of the adjusting mechanism of FIG. 1.

Referring to FIG. 1 and FIG. 2, the electronic whiteboard 100 of the embodiment includes a projection unit 110, an adjusting mechanism 120, and a projection screen 140. The projection screen 140 is adapted to be fixed to a fixing object 50. The projection unit 110 and the adjusting mechanism 120 form a projector 130, and the projection unit 110 is capable of projecting an image beam onto the projection screen 140. The adjusting mechanism 120 includes a fixing base 122, a rotary plate 124, and a first screw 126. The fixing base 122 is adapted to be fixed to the fixing object 50. The rotary plate 124 is pivotally connected to the fixing base 122, and is ball-jointed to the projection unit 110. In the embodiment, the fixing object 50 is, for example, an indoor wall or ceiling.

Figure 3:
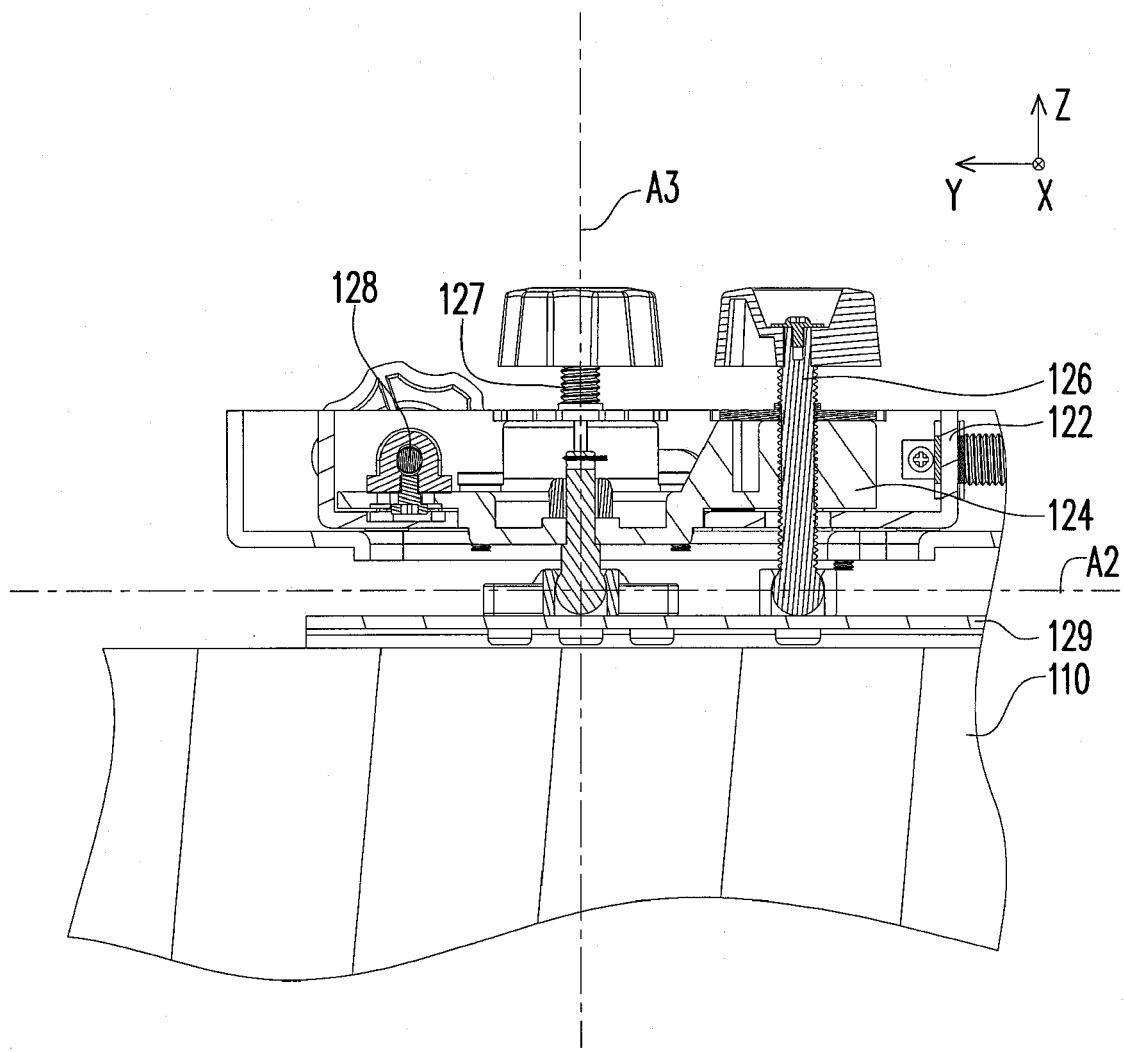
FIG. 3 and FIG. 4 are partial cross-sectional views of the electronic whiteboard of FIG. 1.
Figure 4:
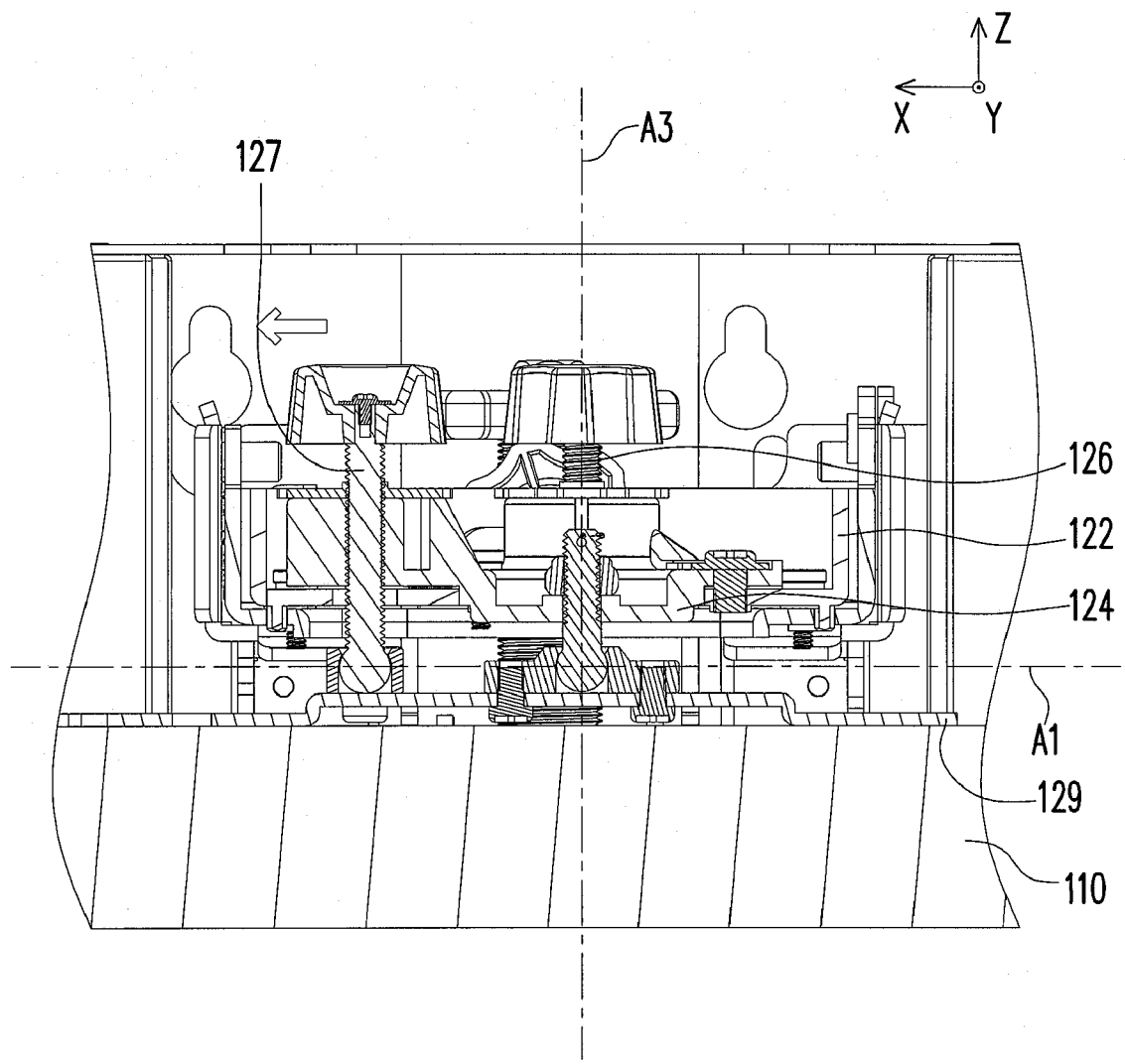
Figure 5:
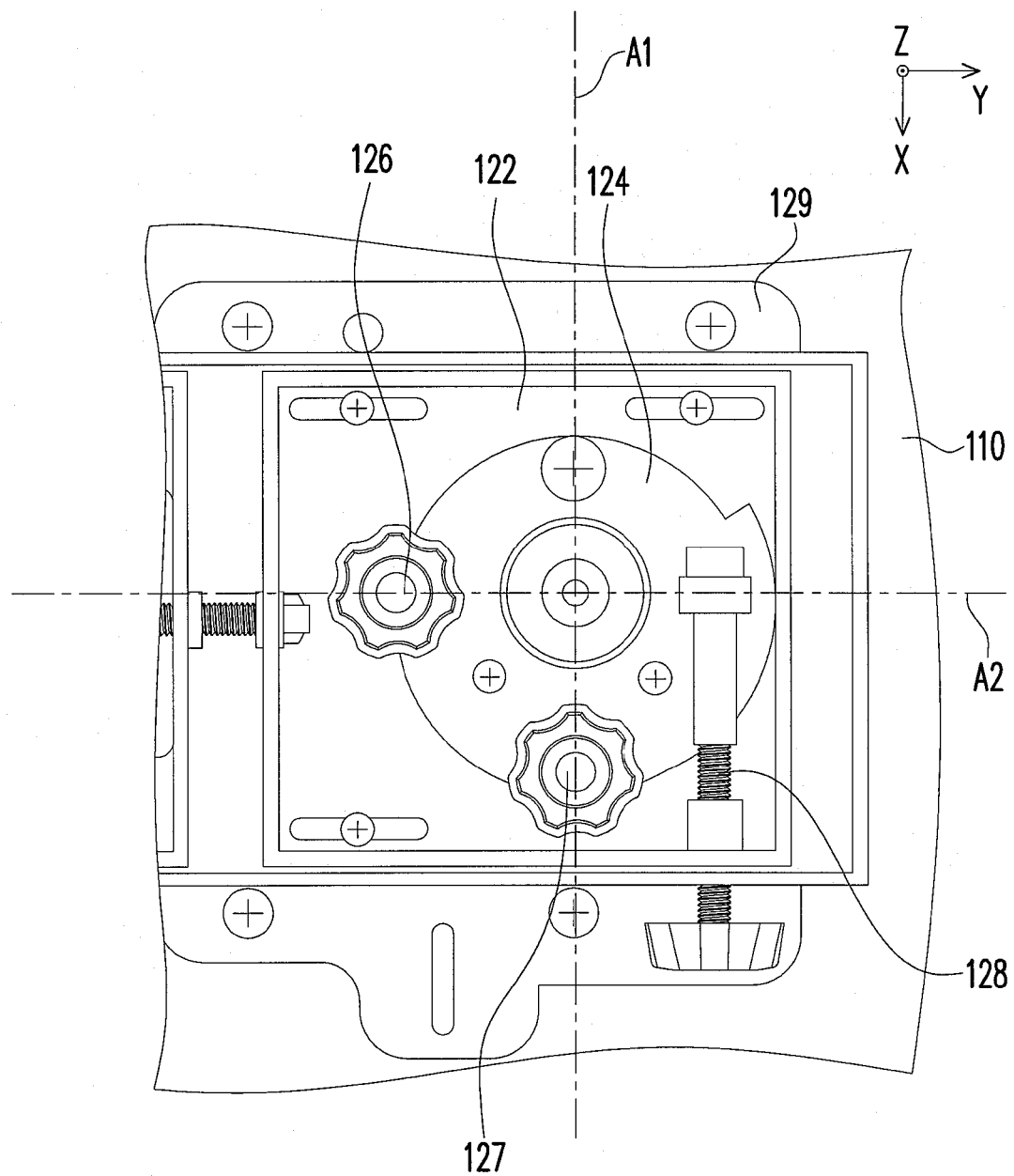
FIG. 5 is a partial top view of the electronic whiteboard of FIG. 1.

Referring to FIG. 3 to FIG. 5, the first screw 126 is locked on the rotary plate 124, and is ball-jointed to the projection unit 110. When the first screw 126 is rotated, the first screw 126 drives the projection unit 110 to rotate relatively to the rotary plate 124 along a first axis A1 (the first axis A1 is substantially paralleled to an X-direction). The rotary plate 124 and the fixing base 122 may not be rotated along the first axis A1, so when the projection unit 110 is rotated relatively to the rotary plate 124 along the first axis A1, the projection unit 110 is equivalent to be rotated relatively to the fixing base 122 and the fixing object 50 (shown in FIG. 1) along the first axis A1.

In other words, when a user wants to rotate the projection unit 110 along the X-direction to adjust an angle of the projection unit 110, the user may rotate the first screw 126 along a Z-direction to drive the projection unit 110 to rotate relatively to the rotary plate 124 along the first axis A1. In the aforementioned adjusting process, the projection unit 110 is only rotated along the first axis A1, so that the projection unit 110 may be independently rotated along the X-direction to adjust the angle of the projection unit 110.

Referring to FIG. 1 to FIG. 5, the adjusting mechanism 120 further includes an interface sheet 129. The interface sheet 129 is fixed on the projection unit 110, wherein the first screw 126 is ball-jointed to the interface sheet 129, and the rotary plate 124 is ball-jointed to the interface sheet 129. In other words, the first screw 126 and the rotary plate 124 are indirectly ball-jointed to the projection unit 110 through the ball joints with the interface sheet 129.

The adjusting mechanism 120 of the embodiment further includes a second screw 127. The second screw 127 is locked on the rotary plate 124 and is ball-jointed to the projection unit 110. When the second screw 127 is rotated, the second screw 127 drives the projection unit 110 to rotate relatively to the rotary plate 124 along a second axis A2. The second axis A2 is substantially perpendicular to the first axis A1 and is substantially paralleled to a Y-direction. The rotary plate 124 and the fixing base 122 may not be rotated along the second axis A2, so when the projection unit 110 is rotated relatively to the rotary plate 124 along the second axis A2, the projection unit 110 is equivalent to be rotated relatively to the fixing base 122 and the fixing object 50 along the second axis A2.

In other words, when the user wants to rotate the projection unit 110 along the Y-direction to adjust the angle of the projection unit 110, the user may rotate the second screw 127 along the Z-direction to drive the projection unit 110 to rotate relatively to the rotary plate 124 along the second axis A2. In the aforementioned adjusting process, the projection unit 110 is only rotated along the second axis A2, so that the projection unit 110 may be independently rotated along the Y-direction to adjust the angle of the projection unit 110.

Referring to FIG. 1 to FIG. 3 and FIG. 5, the adjusting mechanism 120 of the embodiment further includes a third screw 128. The third screw 128 is locked on the fixing base 122 and is connected to the rotary plate 124. When the third screw 128 is rotated, the third screw 128 drives the rotary plate 124 to rotate relatively to the fixing base 122 along a third axis A3. The third axis A3 is substantially perpendicular to the first axis A1 and the second axis A2 and is substantially paralleled to the Z-direction. The rotary plate 124 and the projection unit 110 may not be rotated along the third axis A3, so when the rotary plate 124 is rotated relatively to the fixing base 122 along the third axis A3, the projection unit 110 is simultaneously rotated relatively to the fixing base 122 and the fixing object 50 along the third axis A3.

In other words, when the user wants to rotate the projection unit 110 along the Z-direction to adjust the angle of the projection unit 110, the user may rotate the third screw 128 along the X-direction to drive the rotary plate 124 to rotate relatively to the fixing base 122 along the third axis A3. In the aforementioned adjusting process, the projection unit 110 is only rotated along the third axis A3, so that the projection unit 110 may be independently rotated along the Z-direction to adjust the angle of the projection unit 110.

In summary, the embodiment or the embodiments of the invention may have at least one of the following advantages, the first screw, the second screw or the third screw may be rotated to drive the projection unit to rotate relatively to the rotary plate respectively along the first axis, the second axis or the third axis, so as to independently adjust the angle of the projection unit relative to the fixing object in each direction without causing an angle deviation of the projection unit in other directions, so that an adjustment difficulty of the projection unit is decreased, and adjusting time is saved.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. An adjusting mechanism, adapted to adjust an angle of a projection unit relative to a fixing object, the adjusting mechanism comprising:
   a fixing base adapted to be fixed to the fixing object;
   a rotary plate pivotally connected to the fixing base and adapted to be ball-jointed to the projection unit; and
   a first screw locked on the rotary plate, wherein the first screw drives the projection unit to rotate relatively to the rotary plate along a first axis when the first screw is rotated, and the first screw comprises a ball-shaped end adapted to ball-joint the rotary plate to the projection unit without additional ball bearings.

2. The adjusting mechanism as claimed in claim 1, further comprising:
   a second screw locked on the rotary plate and adapted to be ball-jointed to the projection unit, wherein the second screw drives the projection unit to rotate relatively to the rotary plate along a second axis when the second screw is rotated, and the second axis is substantially perpendicular to the first axis.

3. The adjusting mechanism as claimed in claim 2, further comprising:
   a third screw locked on the fixing base and connected to the rotary plate, wherein the third screw drives the rotary plate to rotate relatively to the fixing base along a third axis when the third screw is rotated, and the third axis is substantially perpendicular to the first axis and the second axis.

4. The adjusting mechanism as claimed in claim 1, further comprising:
   an interface sheet adapted to be fixed on the projection unit, wherein the first screw is ball-jointed to the interface sheet, and the rotary plate is ball-jointed to the interface sheet.

5. A projector, comprising:
   a projection unit; and
   an adjusting mechanism, comprising:
      a fixing base adapted to be fixed to a fixing object;
      a rotary plate pivotally connected to the fixing base and ball-jointed to the projection unit; and
      a first screw locked on the rotary plate, wherein the first screw drives the projection unit to rotate relatively to the rotary plate along a first axis when the first screw is rotated, and the first screw comprises a ball-shaped end adapted to ball-joint the rotary plate to the projection unit without additional ball bearings.

6. The projector as claimed in claim 5, wherein the adjusting mechanism further comprises:
   a second screw locked on the rotary plate and ball-jointed to the projection unit, wherein the second screw drives the projection unit to rotate relatively to the rotary plate along a second axis when the second screw is rotated, and the second axis is substantially perpendicular to the first axis.

7. The projector as claimed in claim 6, wherein the adjusting mechanism further comprises:
   a third screw locked on the fixing base and connected to the rotary plate, wherein the third screw drives the rotary plate to rotate relatively to the fixing base along a third axis when the third screw is rotated, and the third axis is substantially perpendicular to the first axis and the second axis.

8. The projector as claimed in claim 5, wherein the adjusting mechanism further comprises:
   an interface sheet fixed on the projection unit, wherein the first screw is ball-jointed to the interface sheet, and the rotary plate is ball-jointed to the interface sheet.

9. A method for adjusting the projector as claimed in claim 5, comprising:
   rotating the first screw to drive the projection unit to rotate relatively to the rotary plate along the first axis.

10. An electronic whiteboard, comprising:
    a projection unit;
    an adjusting mechanism, comprising:
       a fixing base adapted to be fixed to a fixing object;
       a rotary plate pivotally connected to the fixing base and ball-jointed to the projection unit; and
       a first screw locked on the rotary plate, wherein the first screw drives the projection unit to rotate relatively to the rotary plate along a first axis when the first screw is rotated, and the first screw comprises a ball-shaped end adapted to ball-joint the rotary plate to the projection unit without additional ball bearings; and
    a projection screen adapted to be fixed to the fixing object, wherein the projection unit is capable of projecting an image beam onto the projection screen.

11. The electronic whiteboard as claimed in claim 10, wherein the adjusting mechanism further comprises:

a second screw locked on the rotary plate and ball-jointed to the projection unit, wherein the second screw drives the projection unit to rotate relatively to the rotary plate along a second axis when the second screw is rotated, and the second axis is substantially perpendicular to the first axis.

12. The electronic whiteboard as claimed in claim 11, wherein the adjusting mechanism further comprises:

a third screw locked on the fixing base and connected to the rotary plate, wherein the third screw drives the rotary plate to rotate relatively to the fixing base along a third axis when the third screw is rotated, and the third axis is substantially perpendicular to the first axis and the second axis.

13. The electronic whiteboard as claimed in claim 10, wherein the adjusting mechanism further comprises:

an interface sheet fixed on the projection unit, wherein the first screw is ball-jointed to the interface sheet, and the rotary plate is ball-jointed to the interface sheet.

14. A method for adjusting the electronic whiteboard as claimed in claim 10, comprising:

rotating the first screw to drive the projection unit to rotate relatively to the rotary plate along the first axis.

* * * * *